US007973277B2

(12) United States Patent
Rafferty

(10) Patent No.: US 7,973,277 B2

(45) Date of Patent: Jul. 5, 2011

(54) DRIVING A MASS SPECTROMETER ION TRAP OR MASS FILTER

(75) Inventor: David Rafferty, Webster, TX (US)

(73) Assignee: 1^ST Detect Corporation, Austin, TX (US)

( * ) Notice: Subject to any disclaimer, the term of this patent is extended or adjusted under 35 U.S.C. 154(b) by 214 days.

(21) Appl. No.: 12/472,111

(22) Filed: May 26, 2009

(65) Prior Publication Data

US 2009/0294657 A1 Dec. 3, 2009

Related U.S. Application Data

(63) Continuation-in-part of application No. 12/329,787, filed on Dec. 8, 2008.

(60) Provisional application No. 61/056,362, filed on May 27, 2008.

(51) Int. Cl.
*H01J 49/34* (2006.01)
*H01J 49/00* (2006.01)
*B01D 59/44* (2006.01)

(52) U.S. Cl. ......... 250/282; 250/281; 250/292; 250/290

(58) Field of Classification Search .................. 250/281, 250/282, 292, 290
See application file for complete search history.

(56) References Cited

U.S. PATENT DOCUMENTS

| | | | |
|---|---|---|---|
| 2,373,737 | A | 4/1945 | Artzt |
| 2,507,721 | A | 5/1950 | Law |
| 2,531,050 | A | 11/1950 | Huffer |
| 2,539,156 | A | 1/1951 | Ostreicher |
| 2,549,602 | A | 4/1951 | Hopps |
| 2,553,792 | A | 5/1951 | Smith et al. |
| 2,555,850 | A | 6/1951 | Glyptis |

(Continued)

FOREIGN PATENT DOCUMENTS

| | | |
|---|---|---|
| GB | 676238 | 7/1952 |

(Continued)

OTHER PUBLICATIONS

European Authorized Officer Gerald Rutsch, Written Opinion of the International Preliminary Examining Authority for Application No. PCT/US2009/045283, Jul. 13, 2010, 5 pages.

(Continued)

*Primary Examiner* — Nikita Wells
(74) *Attorney, Agent, or Firm* — Fish & Richardson P.C.

(57) ABSTRACT

A radio frequency (RF) drive system and method for driving the ion trap or mass filter of a mass spectrometer has a programmable RF frequency source coupled to a RF gain stage. The RF gain stage is transformer coupled to a tank circuit formed with the ion trap or mass filter. The power of the RF gain stage driving the ion trap or mass filter is measured using a sensing circuit and a power circuit. A feedback value is generated by the power circuit that is used to adjust the RF frequency source. The frequency of the RF frequency source is adjusted until the power of the RF gain stage is at a minimum level. The frequency value setting the minimum power is used to operate the RF drive system at the resonance frequency of the tank circuit formed with the transformer secondary inductance and the ion trap or mass filter capacitance. Driving a mass spectrometer mass selection element this way results in the lower power consumption, an inherently filtered clean drive signal, smaller size, and reduced electromagnetic emissions.

13 Claims, 9 Drawing Sheets

U.S. PATENT DOCUMENTS 2,575,067 A 11/1951 Mucher
2,580,355 A 12/1951 Lempert
2,582,402 A 1/1952 Szegho
2,604,533 A 7/1952 Koros
2,617,060 A 11/1952 De Gier
2,642,546 A 6/1953 Patla
2,661,436 A 12/1953 Van Ormer
2,663,815 A 12/1953 Mucher
2,756,392 A 7/1956 Donal, Jr.
2,810,091 A 10/1957 Harsh
2,903,612 A 9/1959 Van Ormer
2,921,212 A 1/1960 Berthold
2,939,952 A 6/1960 Paul et al.
2,974,253 A 3/1961 Jepsen
3,065,640 A 11/1962 Langmuir et al.
3,114,877 A 12/1963 Dunham
3,188,472 A 6/1965 Whipple, Jr.
3,307,332 A 3/1967 Grace et al.
3,526,583 A 9/1970 Hayward
3,631,280 A 12/1971 Levin et al.
4,075,533 A 2/1978 Janko
4,499,339 A 2/1985 Richard
4,540,884 A 9/1985 Stafford et al.
4,621,213 A 11/1986 Rand
4,650,999 A 3/1987 Fies, Jr. et al.
4,654,607 A 3/1987 Ishikawa
4,686,367 A 8/1987 Louris et al.
4,703,190 A 10/1987 Tamura et al.
4,736,101 A 4/1988 Syka et al.
4,743,794 A 5/1988 Van Den Broek et al.
4,746,802 A 5/1988 Kellerhals
4,749,860 A 6/1988 Kelley et al.
4,749,904 A 6/1988 Vasterink
4,755,670 A 7/1988 Syka et al.
4,761,545 A 8/1988 Marshall et al.
4,771,172 A 9/1988 Weber-Grabau et al.
4,818,869 A 4/1989 Weber-Grabau
4,867,939 A 9/1989 Deutch
4,924,089 A 5/1990 Caravatti
4,931,639 A 6/1990 McLafferty
4,945,234 A 7/1990 Goodman et al.
4,982,087 A 1/1991 Allemann et al.
4,982,088 A 1/1991 Weitekamp et al.
5,028,777 A 7/1991 Franzen et al.
5,051,582 A 9/1991 Bahns et al.
5,055,678 A 10/1991 Taylor et al.
5,075,547 A 12/1991 Johnson et al.
5,105,081 A 4/1992 Kelley
5,107,109 A 4/1992 Stafford, Jr. et al.
5,118,950 A 6/1992 Bahns et al.
RE34,000 E 7/1992 Syka et al.
5,134,286 A 7/1992 Kelley
5,162,650 A 11/1992 Bier
5,171,991 A 12/1992 Johnson et al.
5,179,278 A 1/1993 Douglas
5,182,451 A 1/1993 Schwartz et al.
5,187,365 A 2/1993 Kelley
5,196,699 A 3/1993 Kelley
5,198,665 A 3/1993 Wells
5,200,613 A 4/1993 Kelley
5,206,509 A 4/1993 McLuckey et al.
5,248,882 A 9/1993 Liang
5,248,883 A 9/1993 Brewer et al.
5,256,875 A 10/1993 Hoekman et al.
5,272,337 A 12/1993 Thompson et al.
5,274,233 A 12/1993 Kelley
5,285,063 A 2/1994 Schwartz et al.
5,291,017 A 3/1994 Wang et al.
5,298,746 A 3/1994 Franzen et al.
5,302,826 A 4/1994 Wells
5,324,939 A 6/1994 Louris et al.
5,331,157 A 7/1994 Franzen
5,340,983 A 8/1994 Deinzer et al.
5,347,127 A 9/1994 Franzen
5,352,892 A 10/1994 Mordehai et al.
5,373,156 A 12/1994 Franzen
5,379,000 A 1/1995 Brewer et al.
5,381,007 A 1/1995 Kelley
5,385,624 A 1/1995 Amemiya et al.
5,386,113 A 1/1995 Franzen et al.
5,396,064 A 3/1995 Wells
5,399,857 A 3/1995 Doroshenko et al.
5,420,425 A 5/1995 Bier et al.
5,420,549 A 5/1995 Prestage
5,436,445 A 7/1995 Kelley et al.
5,436,446 A 7/1995 Jarrell et al.
5,438,195 A 8/1995 Franzen et al.
5,448,061 A 9/1995 Wells
5,448,062 A 9/1995 Cooks et al.
5,449,905 A 9/1995 Hoekman et al.
5,451,781 A 9/1995 Dietrich et al.
5,451,782 A 9/1995 Kelley
5,457,315 A 10/1995 Wells et al.
5,466,931 A 11/1995 Kelley
5,468,957 A 11/1995 Franzen
5,468,958 A 11/1995 Franzen et al.
5,475,227 A 12/1995 LaRue
5,479,012 A 12/1995 Wells
5,479,815 A 1/1996 White et al.
5,481,107 A 1/1996 Takada et al.
5,491,337 A 2/1996 Jenkins et al.
5,493,115 A 2/1996 Deinzer et al.
5,508,516 A 4/1996 Kelley
5,517,025 A 5/1996 Wells et al.
5,521,379 A 5/1996 Franzen et al.
5,521,380 A 5/1996 Wells et al.
5,527,731 A 6/1996 Yamamoto et al.
5,528,031 A 6/1996 Franzen
5,559,325 A 9/1996 Franzen
5,561,291 A 10/1996 Kelley et al.
5,569,917 A 10/1996 Buttrill, Jr. et al.
5,572,022 A 11/1996 Schwartz et al.
5,572,025 A 11/1996 Cotter et al.
5,572,035 A 11/1996 Franzen
5,608,216 A 3/1997 Wells et al.
5,608,217 A 3/1997 Franzen et al.
5,610,397 A 3/1997 Kelley
5,623,144 A 4/1997 Yoshinari et al.
5,625,186 A 4/1997 Frankevich et al.
5,633,497 A 5/1997 Brittain et al.
5,640,011 A 6/1997 Wells
5,644,131 A 7/1997 Hansen
5,650,617 A 7/1997 Mordehai
5,652,427 A 7/1997 Whitehouse et al.
5,654,542 A 8/1997 Schubert et al.
5,663,560 A 9/1997 Sakairi et al.
5,679,950 A 10/1997 Baba et al.
5,679,951 A 10/1997 Kelley et al.
5,693,941 A 12/1997 Barlow et al.
5,696,376 A 12/1997 Doroshenko et al.
5,708,268 A 1/1998 Franzen
5,710,427 A 1/1998 Schubert et al.
5,714,755 A 2/1998 Wells et al.
5,726,448 A 3/1998 Smith et al.
5,734,162 A 3/1998 Dowell
5,739,530 A 4/1998 Franzen et al.
5,747,801 A 5/1998 Quarmby et al.
5,756,993 A 5/1998 Yoshinari et al.
5,756,996 A 5/1998 Bier et al.
5,763,878 A 6/1998 Franzen
5,767,512 A 6/1998 Eiden et al.
5,777,214 A 7/1998 Thompson et al.
5,789,747 A 8/1998 Kato et al.
5,793,038 A 8/1998 Buttrill, Jr.
5,793,091 A 8/1998 Devoe
5,796,100 A 8/1998 Palermo
5,811,800 A 9/1998 Franzen et al.
5,818,055 A 10/1998 Franzen
5,825,026 A 10/1998 Baykut
5,847,386 A 12/1998 Thomson et al.
5,852,294 A 12/1998 Gulcicek et al.
5,859,433 A 1/1999 Franzen
5,864,136 A 1/1999 Kelley et al.
5,880,466 A 3/1999 Benner
5,886,346 A 3/1999 Makarov
5,900,481 A 5/1999 Lough et al.
5,903,003 A 5/1999 Schubert et al.

| | | | |
|---|---|---|---|
| 5,905,258 | A | 5/1999 | Clemmer et al. |
| 5,928,731 | A | 7/1999 | Yanagida et al. |
| 5,936,241 | A | 8/1999 | Franzen et al. |
| 5,962,851 | A | 10/1999 | Whitehouse et al. |
| 5,994,697 | A | 11/1999 | Kato |
| 6,005,245 | A | 12/1999 | Sakairi et al. |
| 6,011,259 | A | 1/2000 | Whitehouse et al. |
| 6,011,260 | A | 1/2000 | Takada et al. |
| 6,015,972 | A | 1/2000 | Hager |
| 6,020,586 | A | 2/2000 | Dresch et al. |
| 6,040,575 | A | 3/2000 | Whitehouse et al. |
| 6,060,706 | A | 5/2000 | Nabeshima et al. |
| 6,069,355 | A | 5/2000 | Mordehai |
| 6,075,243 | A | 6/2000 | Nabeshima et al. |
| 6,075,244 | A | 6/2000 | Baba et al. |
| 6,087,658 | A | 7/2000 | Kawato |
| 6,107,623 | A | 8/2000 | Bateman et al. |
| 6,107,625 | A | 8/2000 | Park |
| 6,121,607 | A | 9/2000 | Whitehouse et al. |
| 6,121,610 | A | 9/2000 | Yoshinari et al. |
| 6,124,591 | A | 9/2000 | Schwartz et al. |
| 6,124,592 | A | 9/2000 | Spangler |
| RE36,906 | E | 10/2000 | Franzen et al. |
| 6,140,641 | A | 10/2000 | Yoshinari et al. |
| 6,147,348 | A | 11/2000 | Quarmby et al. |
| 6,156,527 | A | 12/2000 | Schmidt et al. |
| 6,157,030 | A | 12/2000 | Sakairi et al. |
| 6,157,031 | A | 12/2000 | Prestage |
| 6,177,668 | B1 | 1/2001 | Hager |
| 6,180,941 | B1 | 1/2001 | Takada et al. |
| 6,188,066 | B1 | 2/2001 | Whitehouse et al. |
| 6,190,316 | B1 | 2/2001 | Hirabayashi et al. |
| 6,194,716 | B1 | 2/2001 | Takada et al. |
| 6,196,889 | B1 | 3/2001 | Mensinger |
| 6,204,500 | B1 | 3/2001 | Whitehouse et al. |
| 6,211,516 | B1 | 4/2001 | Syage et al. |
| 6,222,185 | B1 | 4/2001 | Speakman et al. |
| 6,259,091 | B1 | 7/2001 | Eiden et al. |
| 6,276,618 | B1 | 8/2001 | Yanagida et al. |
| 6,291,820 | B1 | 9/2001 | Hamza et al. |
| 6,295,860 | B1 | 10/2001 | Sakairi et al. |
| 6,297,500 | B1 | 10/2001 | Franzen et al. |
| 6,316,769 | B2 | 11/2001 | Takada et al. |
| 6,323,482 | B1 | 11/2001 | Clemmer et al. |
| 6,326,615 | B1 | 12/2001 | Syage et al. |
| 6,329,146 | B1 | 12/2001 | Crooke et al. |
| 6,331,702 | B1 | 12/2001 | Krutchinsky et al. |
| 6,342,393 | B1 | 1/2002 | Hofstadler et al. |
| 6,344,646 | B1 | 2/2002 | Kato |
| 6,379,970 | B1 | 4/2002 | Liebler et al. |
| 6,380,666 | B1 | 4/2002 | Kawato |
| 6,391,649 | B1 | 5/2002 | Chait et al. |
| 6,392,225 | B1 | 5/2002 | Schwartz et al. |
| 6,392,226 | B1 | 5/2002 | Takada et al. |
| 6,403,952 | B2 | 6/2002 | Whitehouse et al. |
| 6,403,953 | B2 | 6/2002 | Whitehouse et al. |
| 6,403,955 | B1 | 6/2002 | Senko |
| 6,414,306 | B1 | 7/2002 | Mayer-Posner et al. |
| 6,414,331 | B1 | 7/2002 | Smith et al. |
| 6,423,965 | B1 | 7/2002 | Hashimoto et al. |
| 6,428,956 | B1 | 8/2002 | Crooke et al. |
| 6,465,779 | B1 | 10/2002 | Takada et al. |
| 6,469,298 | B1 | 10/2002 | Ramsey et al. |
| 6,483,108 | B1 | 11/2002 | Sakairi |
| 6,483,109 | B1 | 11/2002 | Reinhold et al. |
| 6,483,244 | B1 | 11/2002 | Kawato et al. |
| 6,489,609 | B1 | 12/2002 | Baba et al. |
| 6,498,342 | B1 | 12/2002 | Clemmer |
| 6,504,148 | B1 | 1/2003 | Hager |
| 6,507,019 | B2 | 1/2003 | Chernushevich et al. |
| 6,515,279 | B1 | 2/2003 | Baykut |
| 6,515,280 | B1 | 2/2003 | Baykut |
| 6,534,764 | B1 | 3/2003 | Verentchikov et al. |
| 6,538,399 | B1 | 3/2003 | Shimoi et al. |
| 6,541,769 | B1 | 4/2003 | Takada et al. |
| 6,545,268 | B1 | 4/2003 | Verentchikov et al. |
| 6,555,814 | B1 | 4/2003 | Baykut et al. |
| 6,559,441 | B2 | 5/2003 | Clemmer |
| 6,559,443 | B2 | 5/2003 | Shiokawa et al. |
| 6,566,651 | B2 | 5/2003 | Baba et al. |
| 6,570,151 | B1 | 5/2003 | Grosshans et al. |
| 6,571,649 | B2 | 6/2003 | Sakairi et al. |
| 6,573,495 | B2 | 6/2003 | Senko |
| 6,583,409 | B2 | 6/2003 | Kato |
| 6,590,203 | B2 | 7/2003 | Kato |
| 6,596,989 | B2 | 7/2003 | Kato |
| 6,596,990 | B2 | 7/2003 | Kasten et al. |
| 6,600,155 | B1 | 7/2003 | Andrien, Jr. et al. |
| 6,608,303 | B2 | 8/2003 | Amy et al. |
| 6,610,976 | B2 | 8/2003 | Chait et al. |
| 6,621,077 | B1 | 9/2003 | Guevremont et al. |
| 6,624,408 | B1 | 9/2003 | Franzen |
| 6,624,411 | B2 | 9/2003 | Umemura |
| 6,627,875 | B2 | 9/2003 | Afeyan et al. |
| 6,627,876 | B2 | 9/2003 | Hager |
| 6,629,040 | B1 | 9/2003 | Goodlett et al. |
| 6,633,033 | B2 | 10/2003 | Yoshinari et al. |
| 6,635,868 | B2 | 10/2003 | Shiokawa et al. |
| 6,649,907 | B2 | 11/2003 | Ebeling et al. |
| 6,649,911 | B2 | 11/2003 | Kawato |
| 6,653,076 | B1 | 11/2003 | Franza, Jr. et al. |
| 6,653,622 | B2 | 11/2003 | Franzen |
| 6,653,627 | B2 | 11/2003 | Guevremont et al. |
| 6,670,194 | B1 | 12/2003 | Aebersold et al. |
| 6,670,606 | B2 | 12/2003 | Verentchikov et al. |
| 6,674,067 | B2 | 1/2004 | Grosshans et al. |
| 6,674,071 | B2 | 1/2004 | Franzen et al. |
| 6,677,582 | B2 | 1/2004 | Yamada et al. |
| 6,683,301 | B2 | 1/2004 | Whitehouse et al. |
| 6,690,004 | B2 | 2/2004 | Miller et al. |
| 6,690,005 | B2 | 2/2004 | Jenkins et al. |
| 6,703,607 | B2 | 3/2004 | Stott et al. |
| 6,703,609 | B2 | 3/2004 | Guevremont et al. |
| 6,707,033 | B2 | 3/2004 | Okumura et al. |
| 6,710,334 | B1 | 3/2004 | Twerenbold |
| 6,710,336 | B2 | 3/2004 | Wells |
| 6,717,155 | B1 | 4/2004 | Zschornack et al. |
| 6,720,554 | B2 | 4/2004 | Hager |
| 6,730,903 | B2 | 5/2004 | Kawato |
| 6,737,640 | B2 | 5/2004 | Kato |
| 6,744,042 | B2 | 6/2004 | Zajfman et al. |
| 6,745,134 | B2 | 6/2004 | Kobayashi et al. |
| 6,753,523 | B1 | 6/2004 | Whitehouse et al. |
| 6,759,652 | B2 | 7/2004 | Yoshinari et al. |
| 6,762,406 | B2 | 7/2004 | Cooks et al. |
| 6,765,198 | B2 | 7/2004 | Jenkins et al. |
| 6,770,871 | B1 | 8/2004 | Wang et al. |
| 6,770,872 | B2 | 8/2004 | Bateman et al. |
| 6,770,875 | B1 | 8/2004 | Guevremont et al. |
| 6,774,360 | B2 | 8/2004 | Guevremont et al. |
| 6,777,671 | B2 | 8/2004 | Doroshenko |
| 6,777,673 | B2 | 8/2004 | Chang et al. |
| 6,784,421 | B2 | 8/2004 | Park |
| 6,787,760 | B2 | 9/2004 | Belov et al. |
| 6,787,767 | B2 | 9/2004 | Kato |
| 6,791,078 | B2 | 9/2004 | Giles et al. |
| 6,794,640 | B2 | 9/2004 | Bateman et al. |
| 6,794,641 | B2 | 9/2004 | Bateman et al. |
| 6,794,642 | B2 | 9/2004 | Bateman et al. |
| 6,797,949 | B2 | 9/2004 | Hashimoto et al. |
| 6,800,851 | B1 | 10/2004 | Zubarev et al. |
| 6,803,569 | B2 | 10/2004 | Tsybin et al. |
| 6,809,318 | B2 | 10/2004 | Krutchinsky et al. |
| 6,815,673 | B2 | 11/2004 | Plomley et al. |
| 6,822,224 | B2 | 11/2004 | Guevremont |
| 6,825,461 | B2 | 11/2004 | Guevremont et al. |
| 6,828,551 | B2 | 12/2004 | Kato |
| 6,831,275 | B2 | 12/2004 | Franzen et al. |
| 6,833,544 | B1 | 12/2004 | Campbell et al. |
| 6,838,666 | B2 | 1/2005 | Ouyang et al. |
| 6,844,547 | B2 | 1/2005 | Syka |
| 6,847,037 | B2 | 1/2005 | Umemura |
| 6,852,971 | B2 | 2/2005 | Baba et al. |
| 6,858,840 | B2 | 2/2005 | Berkout et al. |
| 6,861,644 | B2 | 3/2005 | Miseki |
| 6,867,414 | B2 | 3/2005 | Buttrill, Jr. |
| 6,870,159 | B2 | 3/2005 | Kawato |
| 6,872,938 | B2 | 3/2005 | Makarov et al. |

| | | | | |
|---|---|---|---|---|
| 6,872,941 | B1 | 3/2005 | Whitehouse et al. | |
| 6,875,980 | B2 | 4/2005 | Bateman et al. | |
| 6,878,932 | B1 | 4/2005 | Kroska | |
| 6,888,133 | B2 | 5/2005 | Wells et al. | |
| 6,888,134 | B2 | 5/2005 | Hashimoto et al. | |
| 6,894,276 | B1 | 5/2005 | Takada et al. | |
| 6,897,438 | B2 | 5/2005 | Soudakov et al. | |
| 6,897,439 | B1 | 5/2005 | Whitehouse et al. | |
| 6,900,430 | B2 | 5/2005 | Okumura et al. | |
| 6,900,433 | B2 | 5/2005 | Ding | |
| 6,903,331 | B2 | 6/2005 | Bateman et al. | |
| 6,906,319 | B2 | 6/2005 | Hoyes | |
| 6,906,324 | B1 | 6/2005 | Wang et al. | |
| 6,911,651 | B2 | 6/2005 | Senko et al. | |
| 6,914,242 | B2 | 7/2005 | Mordehai | |
| 6,933,498 | B1 | 8/2005 | Whitten et al. | |
| 6,949,743 | B1 | 9/2005 | Schwartz | |
| 6,953,929 | B2 | 10/2005 | Kato | |
| 6,958,473 | B2 | 10/2005 | Belov et al. | |
| 6,960,760 | B2 | 11/2005 | Bateman et al. | |
| 6,972,408 | B1 | 12/2005 | Reilly | |
| 6,977,373 | B2 | 12/2005 | Yoshinari et al. | |
| 6,977,374 | B2 | 12/2005 | Kawato | |
| 6,982,413 | B2 | 1/2006 | Knecht et al. | |
| 6,982,415 | B2 | 1/2006 | Kovtoun | |
| 6,987,261 | B2 | 1/2006 | Horning et al. | |
| 6,989,533 | B2 | 1/2006 | Bellec et al. | |
| 6,995,364 | B2 | 2/2006 | Makarov et al. | |
| 6,995,366 | B2 | 2/2006 | Franzen | |
| 6,998,609 | B2 | 2/2006 | Makarov et al. | |
| 6,998,610 | B2 | 2/2006 | Wang | |
| 7,019,289 | B2 | 3/2006 | Wang | |
| 7,019,290 | B2 | 3/2006 | Hager et al. | |
| 7,022,981 | B2 | 4/2006 | Kato | |
| 7,026,610 | B2 | 4/2006 | Kato | |
| 7,026,613 | B2 | 4/2006 | Syka | |
| 7,045,797 | B2 | 5/2006 | Sudakov et al. | |
| 7,049,580 | B2 | 5/2006 | Londry et al. | |
| 7,064,319 | B2 | 6/2006 | Hashimoto et al. | |
| 7,071,467 | B2 | 7/2006 | Bateman et al. | |
| 7,075,069 | B2 | 7/2006 | Yoshinari et al. | |
| 7,078,685 | B2 | 7/2006 | Takada et al. | |
| 7,095,013 | B2 | 8/2006 | Bateman et al. | |
| 7,102,126 | B2 | 9/2006 | Bateman et al. | |
| 7,102,129 | B2 | 9/2006 | Schwartz | |
| 7,112,787 | B2 | 9/2006 | Mordehal | |
| 7,115,862 | B2 | 10/2006 | Nagai et al. | |
| 7,119,331 | B2 | 10/2006 | Chang et al. | |
| 7,129,478 | B2 | 10/2006 | Baba et al. | |
| 7,141,789 | B2 | 11/2006 | Douglas et al. | |
| 7,154,088 | B1 | 12/2006 | Blain et al. | |
| 7,157,698 | B2 | 1/2007 | Makarov et al. | |
| 7,161,141 | B2 | 1/2007 | Mimura et al. | |
| 7,161,142 | B1 | 1/2007 | Patterson et al. | |
| 7,170,051 | B2 | 1/2007 | Berkout et al. | |
| 7,176,456 | B2 | 2/2007 | Kawato | |
| 7,183,542 | B2 | 2/2007 | Mordehai | |
| 7,186,973 | B2 | 3/2007 | Terui et al. | |
| 7,208,726 | B2 | 4/2007 | Hidalgo et al. | |
| 7,211,792 | B2 | 5/2007 | Yamaguchi et al. | |
| 7,217,919 | B2 | 5/2007 | Boyle et al. | |
| 7,217,922 | B2 | 5/2007 | Jachowski et al. | |
| 7,227,137 | B2 | 6/2007 | Londry et al. | |
| 7,227,138 | B2 | 6/2007 | Lee et al. | |
| 7,250,600 | B2 | 7/2007 | Yamaguchi | |
| 7,270,020 | B2 | 9/2007 | Gregory et al. | |
| 7,279,681 | B2 | 10/2007 | Li et al. | |
| 7,294,832 | B2 | 11/2007 | Wells et al. | |
| 7,297,939 | B2 | 11/2007 | Bateman et al. | |
| 7,323,683 | B2 | 1/2008 | Krutchinsky et al. | |
| 7,329,866 | B2 | 2/2008 | Wang | |
| 7,361,890 | B2 | 4/2008 | Patterson | |
| 7,375,320 | B2 | 5/2008 | Lee et al. | |
| 7,423,262 | B2 | 9/2008 | Mordehai et al. | |
| 7,446,310 | B2 | 11/2008 | Kovtoun | |
| 7,449,686 | B2 | 11/2008 | Wang et al. | |
| 7,456,389 | B2 | 11/2008 | Kovtoun | |
| 7,582,864 | B2 * | 9/2009 | Verentchikov | 250/290 |
| 2002/0005479 | A1 | 1/2002 | Yoshinari | |
| 2004/0217285 | A1 | 11/2004 | Smith | |
| 2004/0238737 | A1 | 12/2004 | Hager | |
| 2006/0163472 | A1 | 7/2006 | Marquette | |
| 2006/0273251 | A1 | 12/2006 | Verbeck | |
| 2007/0069121 | A1 | 3/2007 | Mimura et al. | |
| 2007/0158545 | A1 | 7/2007 | Verentchikov | |
| 2008/0012657 | A1 | 1/2008 | Vaszari | |
| 2008/0017794 | A1 | 1/2008 | Verbeck | |
| 2008/0035842 | A1 | 2/2008 | Sudakov | |
| 2008/0128605 | A1 | 6/2008 | Well | |
| 2009/0146054 | A1 * | 6/2009 | Rafferty | 250/281 |
| 2009/0256070 | A1 * | 10/2009 | Nagano et al. | 250/282 |
| 2009/0261247 | A1 * | 10/2009 | Cooks et al. | 250/292 |

FOREIGN PATENT DOCUMENTS

| | | |
|---|---|---|
| GB | 2100078 | 12/1982 |
| WO | WO03/067627 | 8/2003 |

OTHER PUBLICATIONS

European Authorized Officer Mustafa Corapci, International Preliminary Report on Patentability for Application No. PCT/US2009/045283, Sep. 16, 2010, 9 pages.

Authorized Officer Robert Kim, Written Opinion of the International Preliminary Examining Authority for Application No. PCT/US2008/086241, Sep. 17, 2010, 5 pages.

"Mass Spectrometry," Wikipedia, the free encyclopedia, downloaded on Feb. 13, 2009 from http://en.wikipedia.org/w/index.php?title=Mass_spectrometry&printiable=yes; pp. 1-15.

"Quadrupole ion trap," Wikipedia, the free encyclopedia, downloaded on Jul. 16, 2007 from http://en.wikipedia.org/wiki/Quadrupole_ion-trap.

Angulo, Luis, "Electronic SPDT controls two PCs," Sep. 2, 1999, www.ednmag.com, pp. 136-137.

Benilan, Marie-Noelle et al., "Ion Confinement by a Radiofrequency Electrical Field in a Cylindrical Trap," International Journal of Mass Spectrometry and Ion Physics, 11 (1973), pp. 421-423.

Ciasci, Ioan, "Charge Pump Converts $V_{IN}$ to $\pm V_{OUT}$," Sep. 2, 1999, www.ednmag.com, p. 134.

Harris, William et al., "Detection of Chemical Warfare-Related Species on Complex Aerosol Particles Deposited on Surfaces Using an Ion Trap-Based Aerosol Mass Spectrometer," Anal. Chem. 2007, 79 (6), pp. 2354-2358.

Harris, William et al. "MALDI of Individual Biomolecule-Containing Airborne Particles in an Ion Trap Mass Spectrometer," Anal. Chem. 2005, 77 (13), pp. 4042-4050.

Hoffart, Fran, "Li-ion battery charger adapts to different chemistries," Sep. 2, 1999, www.ednmag.com, pp. 146.

Jonscher, Karen R. et al., "Matrix-assisted Lasser Desorption Ionization/Quadrupole Ion Trap Mass Spectrometry of Peptides," The Journal of Biological Chemistry, 1997 vol. 272, No. 3, Jan. 17 issue, pp. 1735-1741.

Jonscher, Karen R. et al., "The Whys and Wherefores of Quadrupole Ion Trap Mass Spectrometry," Ion Trap Mass Spectrometry, 1996, Retrieved on Feb. 13, 2009 from the Internet at: http://www.abrf.org/ABRFNews/1996/September1996/sep96iontrap.html.

Koizumi, Hideya, et al., "Trapping of Intact, Singly-Charged, Bovine Serum Albumin Ions Injected from the Atmosphere with a 10-cm Diameter, Frequency-Adjusted Linear Quadrupole Ion Trap," J. Am Soc Mass Spectrom 2008, 19, pp. 1942-1947.

Lazar, Alexandru et al., "Laser Desorption/in Situ Chemical Ionization Aerosol Mass Spectrometry for Monitoring Tributyl Phosphate on the Surface of Environmental Particles," Anal. Chem. 2000, 72 99), pp. 2142-2147.

Lazar, Alexandru et al., "Laser desorption/ionization coupled to tandem mass spectrometry for real-time monitoring of paraquat on the surface of environmental particles," Rapid Commun. Mass Spectrom, 2000, 14, pp. 1523-1529.

Londry, F.A. et al., "Mass selective axial ion ejection from a linear quadrupole ion trap," J Am Soc of Mass Spectrom., vol. 14, Issue 10, Oct. 2003, pp. 1130-1147 http://www.sciencedirect.com/science?_ob=ArticleURL&_udi=B6TH2-497HFH6-3&_user=10&_rdoc=1&_fmt=&_orig=search&_sort=d&view=c&_version=1&_urlVersion=0&_userid=10&md5=7c6211b59a632a920ef6ca9add1bdd0d.

McCarthy, Mary, "DDS device provides amplitude modulation," Sep. 2, 1999, www.ednmag.com pp. 133-134.

Moxom, Jeremy et al., "Analysis of Volatile Organic Compounds in Air with a Micro Ion Trap Mass Analyzer,," Anal. Chem., 2003, 75 (15),3739-3743; DOI: 10.1021/ac034043k Publication date Jun. 19, 2003.
Moxom, Jeremy et al., "Double resonance ejection in a micro ion trap mass spectrometer," Rapid Commun. Mass Spectrom. 2002, 16: pp. 755-760.
Moxom, Jeremy et al., "Sample pressure effects in a micro ion trap mass spectrometer," RCM Letter to the Editor, Rapid Commun. Mass Spectrom., 2004, 18: pp. 721-723.
Palasek, Thomas A., "An RF Oscillator for Rocket-Borne and Balloon-Borne Quadrupole Mass Spectrometers," Northeastern University Electronics Research Lab, Scientific Report No. 2, Sep. 10, 1979, Thesis paper reproduced by National Technical Information Service (NTIS).
Pau, S. et al., "Microfabricated Quadrupole Ion Trap for Mass Spectrometer Applications," The American Physical Society, Physical Review Letters, 2006; pp. 120801-1 to 120801-4.
Pau, S. et al., "Planar Geometry for Trapping and Separating Ions and Charging Particles," Anal. Chem., 2007, 79 (17), pp. 6857-6861.
Ramirez, D. et al., "GMR Sensors Manage Batteries," Sep. 2, 1999, www.ednmag.com, pp. 138-140.
Sherman, David, "Program turns PC sound card into a function generator," Sep. 2, 1999, www.ednmag.com, pp. 142-144.
Tabert, Amy et al., "Co-occurrence of Boundary and Resonance Ejection in a Multiplexed Rectilinear Ion Trap Mass Spectrometer," J. Am Soc Mass Spectrom. 2005, 17, pp. 56-59.
Whitten, William B. et al., "High-pressure ion trap mass spectrometry," Rapid Commun. Mass Spectrom., 2004, 18: pp. 1749-1752.
Wolczko, Andrzej, "Driver thermally compensates LED," Sep. 2, 1999, www.ednmag.com, pp. 140-142.
Horowitz, Hill, "The Art of Electronics," 1980, Cambridge University Press, Cambridge, UK, XP002558161, pp. 24-35.
European Authorized Officer Gerald Rutsch, International Search Report and the Written Opinion for Application No. PCT/US2009/045283, Dec. 15, 2009, 14 pages.
Authorized Officer Blaine R. Copenheaver, International Search Report and the Written Opinion for Application No. PCT/US2008/086241, Feb. 9, 2009, 7 pages.

* cited by examiner

DRIVING A MASS SPECTROMETER ION TRAP OR MASS FILTER

CROSS-REFERENCE TO RELATED APPLICATIONS

This application claims the benefit of priority to U.S. Provisional Application Ser. No. 61/056,362, filed on May 27, 2008, which is incorporated by reference herein. This application is a continuation-in-part of U.S. patent application Ser. No. 12/329,787, filed Dec. 8, 2008.

TECHNICAL FIELD

This invention relates to ion traps, ion trap mass spectrometers, and more particularly to a radio frequency system for driving a mass spectrometer ion trap or mass filter, such as a linear quadrupole.

SUMMARY

A radio frequency (RF) system for driving a mass spectrometer ion trap has a frequency programmable RF generator that produces an RF signal. An RF gain stage receives the RF signal and generates an amplified RF signal. Sense circuitry generates a sense signal proportional to a supply current delivered to the RF gain stage. A transformer has a primary coupled to the output of the RF gain stage and a secondary coupled to form a tank circuit with the capacitance of the mass spectrometer ion trap. The power circuitry uses the sense signal to determine power consumption of the RF gain stage in order to adjust the frequency of the RF generator so that the power supplied to the RF gain stage is decreased.

Once the frequency of the RF generator is set, the power monitoring may be used to continuously adjust the frequency as variable conditions cause the resonance frequency of the transformer secondary and the ion trap to drift. Because much lower power is required to drive the mass spectrometer ion trap or mass filter (such as a linear quadrupole), the mass spectrometer may be reduced in size and cost thereby increasing the number of potential applications.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
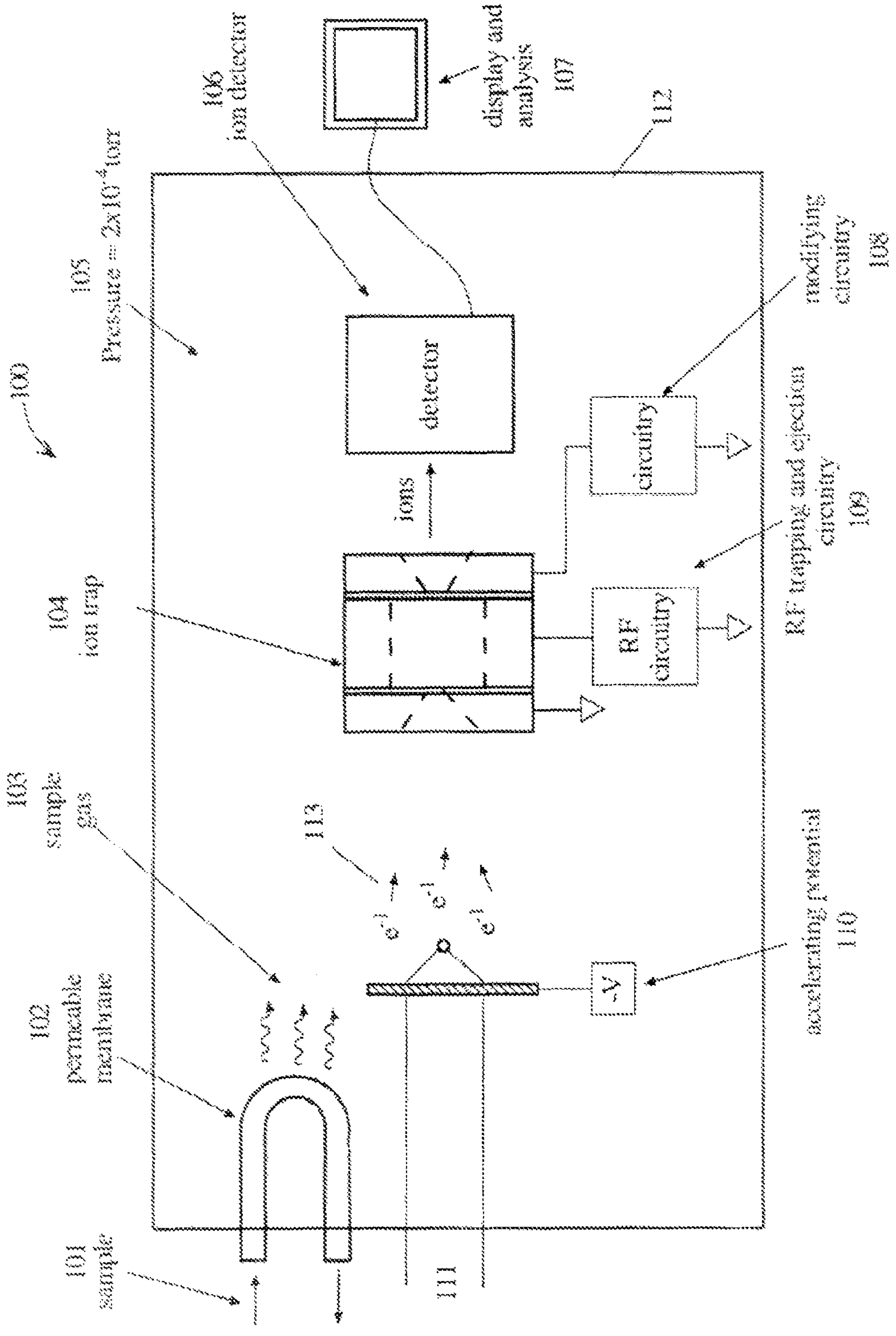
FIG. 1 illustrates a system block diagram of a mass spectrometer system.

In embodiments of the present invention, an ion trap performs mass spectrometric chemical analysis. The ion trap dynamically traps ions from a measurement sample using a dynamic electric field generated by a driving signal or signals. The ions are selectively ejected corresponding to their mass-charge ratio (mass (m)/charge (z)) by changing the characteristics of the radio frequency (RF) electric field (e.g., amplitude, frequency, etc.) that is trapping them.

In embodiments of the present invention, the ion trap dynamically traps ions in a quadrupole field within the ion trap. This field is created by an electrical signal from a RP source applied to the center electrode relative to the end cap voltages (or signals). In the simplest form, a signal of constant RF frequency is applied to the center electrode and the two end cap electrodes are maintained at a static zero volts. The amplitude of the center electrode signal is ramped up linearly in order to selectively destabilize different masses of ions held within the ion trap. This amplitude ejection configuration may not result in optimal performance or resolution and may actually result in double peaks in the output spectra. This amplitude ejection method may be improved upon by applying a second signal differentially across the end caps. This second signal causes a dipole axial excitation that results in the resonant ejection of ions from the ion trap when the ions' secular frequency of oscillation within the trap matches the end cap excitation frequency.

The ion trap or mass filter has an equivalent circuit that appears as a nearly pure capacitance. The amplitude of the voltage necessary to drive the ion trap may be high (e.g., 1500 volts) and often requires the use of transformer coupling to generate the high voltage. The inductance of the transformer secondary and the capacitance of the ion trap form a parallel tank circuit. Driving this circuit at a frequency other than resonance may create unnecessary losses and may increase the cost and size of the circuitry. This would particularly impede efforts to miniaturize a mass spectrometer to increase its use and marketability.

In addition, driving the circuit at resonance has other benefits such as producing the cleanest, lowest distortion, and lowest noise signal possible. A tank circuit attenuates signals of all frequencies except the resonant frequency; in this way, the tank circuit operates as its own narrow bandpass filter in which only a particular frequency resonates. Off frequency noise and harmonies are filtered out. Also, at resonance, the amount of power coming from the signal driving amplifier is very low. The power needed is only the power that is lost in transformer inefficiencies or resistive losses. The circuit power is transferred back and forth between the inductive and capacitive elements in the tank circuit in a small physical area. Since little power is driven from an external amplifier, less power is being radiated as electromagnetic interference (EMI).

Therefore, it may be advantageous for a RF system to ensure that the ion trap is driven with circuitry that minimizes size of the components, reduces cost and power, provides an ultra high quality signal, and results in reduced radiated EMI. This may be very important in a portable mass spectrometer application.

FIG. 1 illustrates a block diagram of elements in mass spectrometer system 100. Sample 101 may be introduced into chamber 112 having a low pressure 105 (e.g. a vacuum) through permeable membrane tubing 102. As a result, concentrated sample gas 103 is admitted through membrane tubing 102 and makes its way to ion trap 104. Electrons 113 are generated in a well-known manner by source 111 and are directed towards ion trap 104 by accelerating potential 110. Electrons 113 ionize sample gas 103 in ion trap 104. RF trapping and ejecting circuitry 109 is coupled to ion trap 104 to create alternating electric fields within ion trap 104 to first trap and then eject ions in a manner proportional to the mass of the ions. Additional modifying circuitry 108 may be used to enhance the operation of ion trap 104. Ion detector 106 registers the number of ions emitted at different time intervals that correspond to particular ion masses. These ion numbers are digitized for analysis and displayed as spectra oil display 107.

Permeable membrane 102 may include an imbedded heating apparatus (not shown) to ensure that a gas sample is at a uniform temperature. Additionally, apparatus 111 providing electrons 113 may include an electrostatic lens that is operable to focus electrons 113 that enter ion trap 104. The electrostatic lens may have a focal point in front of the aperture of the end cap (e.g., see FIG. 3). The electrostatic lens operates to provide a better electron distribution in ion trap 104 as well as to increase the percentage of electrons that enter trap 104. Source 111 of electrons 113 may be configured with carbon nanotubes as electron emitters that enable the electrons to be produced at a lower power than conventional means. It should also be noted that those skilled in the art would recognize that there are many configurations of mass spectrometer 100 that include an ion trap that may have varied (1) methods of introducing sample 101 to mass spectrometer 100, (2) ionization methods 111, and (3) detectors 106, which are within the scopes of embodiments of the present invention.

In embodiments of the present invention, ion trap 104 is configured to have a design that produces a minimum capacitance load to circuitry 109. Ion trap 104 may have its inside surface roughness minimized to improve its characteristics.

Figure 2:
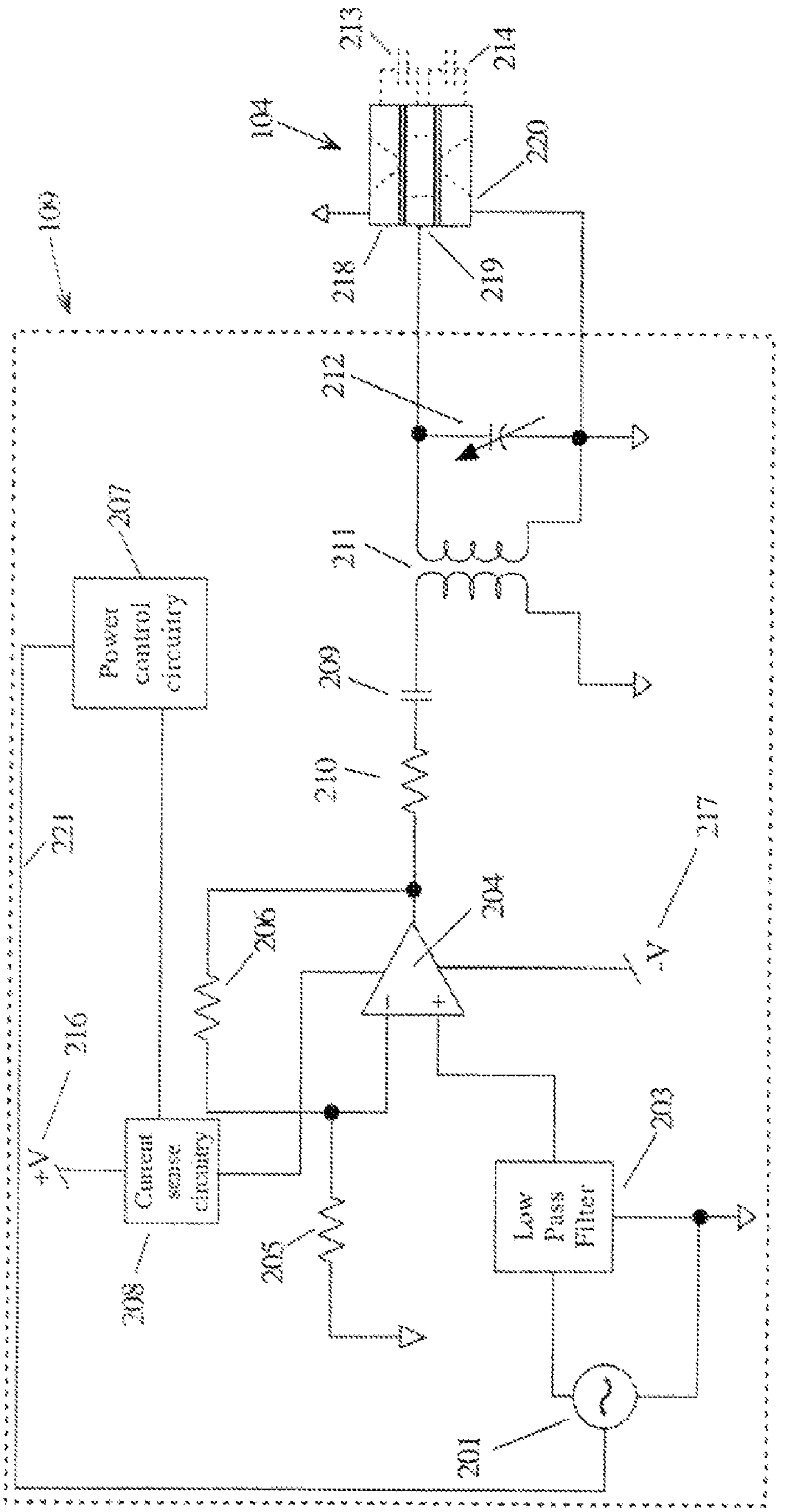
FIG. 2 illustrates a RF trapping and ejecting circuitry for a mass spectrometer system.

FIG. 2 illustrates a circuit and block diagram of RF trapping and ejecting circuitry 109 driving ion trap 104. Exemplary ion trap 104 comprises center electrode 219 and end caps 218 and 220. Ion trap 104 may be as described herein, or any other equivalent ion trap design that may be operated in a manner as described herein: Parasitic capacitances 213 and 214 are shown by dotted lines. End caps 218 and 220 may be coupled to a ground potential and capacitances 213 and 214 represent capacitance loading to circuitry 109.

RF source 201 generates a sinusoidal RF signal and is shown having an input coupled to control line(s) 221. Values of control line(s) 221 are operable to adjust the frequency of the RF signal either up or down. In embodiments, the frequency of RF source 201 may be adjusted manually in response to an optimizing parameter. Differential amplifier 204 (e.g., operational amplifier) has positive and negative inputs and an output. Negative feedback using resistors 205 and 206 may be used to set the closed loop gain of the amplifier stage as the ratio of the resistor values. The RF signal is filtered (e.g., low pass or band pass) with filter 203 and applied to the positive input of amplifier 204. Amplifier 204 uses capacitor 209 to block the amplifier output offset voltage, and resistor 210 to improve amplifier stability. The filtered output of amplifier 204 is applied to the input of transformer 211. Since a high voltage (e.g., 1500 volts) may be required to drive ion trap 104, transformer 211 may be a step up transformer. This allows the primary side components of the amplifying stage to have a relatively low voltage.

Amplifier 204 may be powered by bipolar power supply (PS) voltages 216 and 217. Current sensing circuitry 208 may be used to monitor the current from PS voltage 216. Power control circuitry 207 may be configured to monitor the power being dissipated driving ion trap 104 in order to control RF source 201 via control line(s) 221. Control circuitry 207 may be either analog or digital depending on the characteristics of RF source 201. In either case, the circuitry 109 operates to drive ion trap 104 at a frequency that minimizes the power provided by PS voltages 216 and 217.

The frequency of RF source 201 may be adjusted to minimize the power required to drive ion trap 104. The resulting frequency of RF source 201 that minimizes the drive power is the frequency that resonates the circuitry comprising the inductance at the secondary of transformer 211 and the capacitance of ion trap 104. The frequency of RF source 201 may be set at a desired value, and a variable component (e.g., variable capacitor 212) used to change the secondary circuitry to resonate with the set desired frequency of RF source 201. A center frequency of RF source 201 may be set and the secondary circuitry adjusted to tune the secondary of transformer 211. The feedback with control 221 may be then used to adjust the resonant frequency to dynamically minimize the power required to drive ion trap 104.

Circuitry 207 may employ a programmable processor that first sets the frequency of RF source 201 to minimize the power to ion trap 104. Then, after a time period where ions are trapped, amplitude feedback from the secondary of transformer 211 may be used to adjust either the amplitude of RF source 201 or the gain of the amplifier stage such that the amplitude of the secondary signal driving ion trap 104 is amplitude modulated in a manner that operates to eject ions.

Circuitry 207 may employ a programmable processor that first sets the frequency of RF source 201 to minimize the power to ion trap 104. Then, after a time period where ions are trapped, the frequency of RF source 201 is varied such that the frequency of the secondary signal driving ion trap 104 is frequency modulated in a manner that operates to eject ions.

In one embodiment, circuitry 109 may employ a capacitive voltage divider to feedback a sample of the output voltage of transformer 211 to the negative input of amplifier 204. This negative feedback may be used to stabilize the voltage output transformer 211 when driving ion trap 104.

Figure 3:
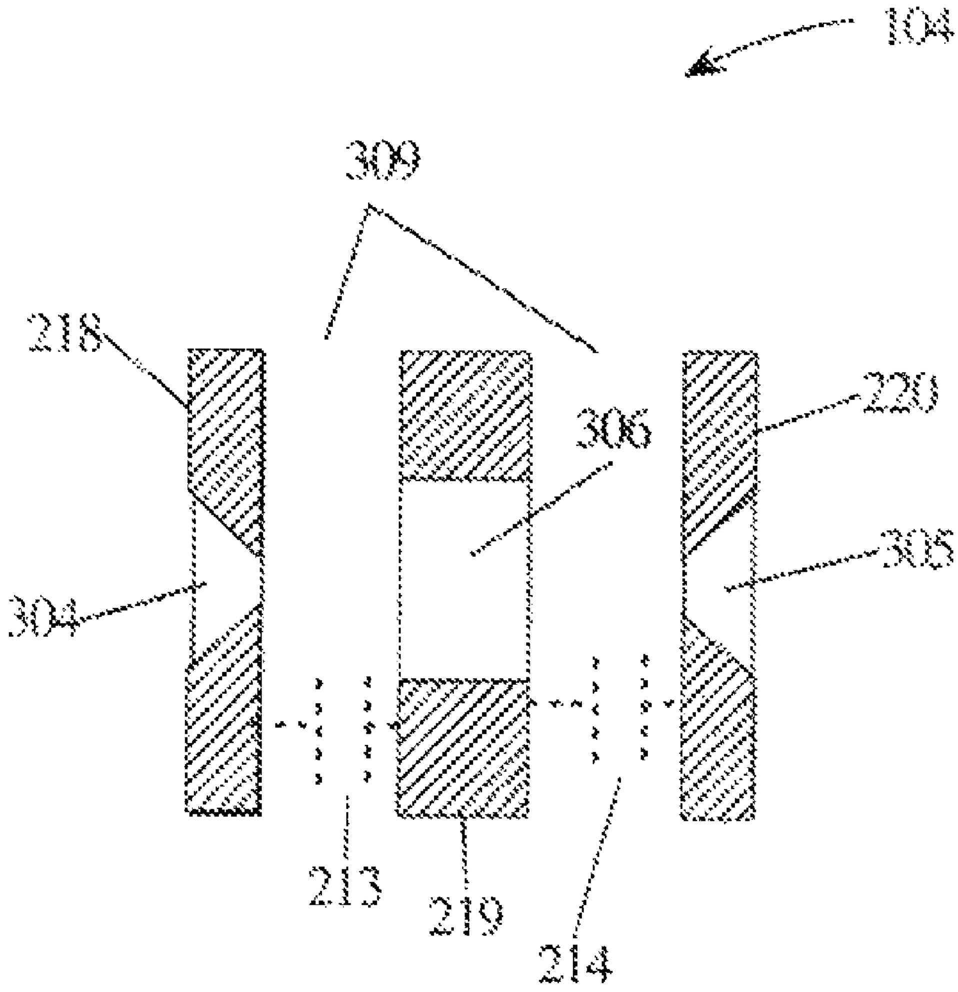
FIG. 3 illustrates an ion trap.

FIG. 3 illustrates cross-sections and details of electrodes of ion trap 104 according to embodiments of the present invention. First end cap 218 has inlet aperture 304, central electrode 219 has aperture 306 and second end cap 220 has outlet aperture 305. End caps 218 and 219, and electrode 219 may have toroidal configurations, or other equivalent shapes sufficient to trap and eject ions in accordance with embodiments of the present invention. First ion trap end cap 218 may be typically coupled to ground or zero volts, however, other embodiments may use other than zero volts. For example, first end cap 218 may be connected to a variable DC voltage or other signal. Ion trap central electrode 219 is driven by circuitry 109 (see FIGS. 1 and 2). Second ion trap end cap 220 may be connected to zero volts directly or by circuit elements 108 (see FIG. 1) or to another signal source. Thin insulators (not shown) may be positioned in spaces 309 to isolate first end cap 218, second end cap 220, and central electrode 219, thus forming capacitances 213 and 214 (shown by dotted lines). Operation and configuration of a typical ion trap is described in U.S. Pat. No. 3,065,640, and has subsequently been covered by many authors in the field, including a description provided by March (March, R. E. and Todd, J. F. J, "Practical Aspects of Ion Trap Mass Spectrometry," 1995, CRC Press), both of which are hereby incorporated by reference herein.

Figure 4:
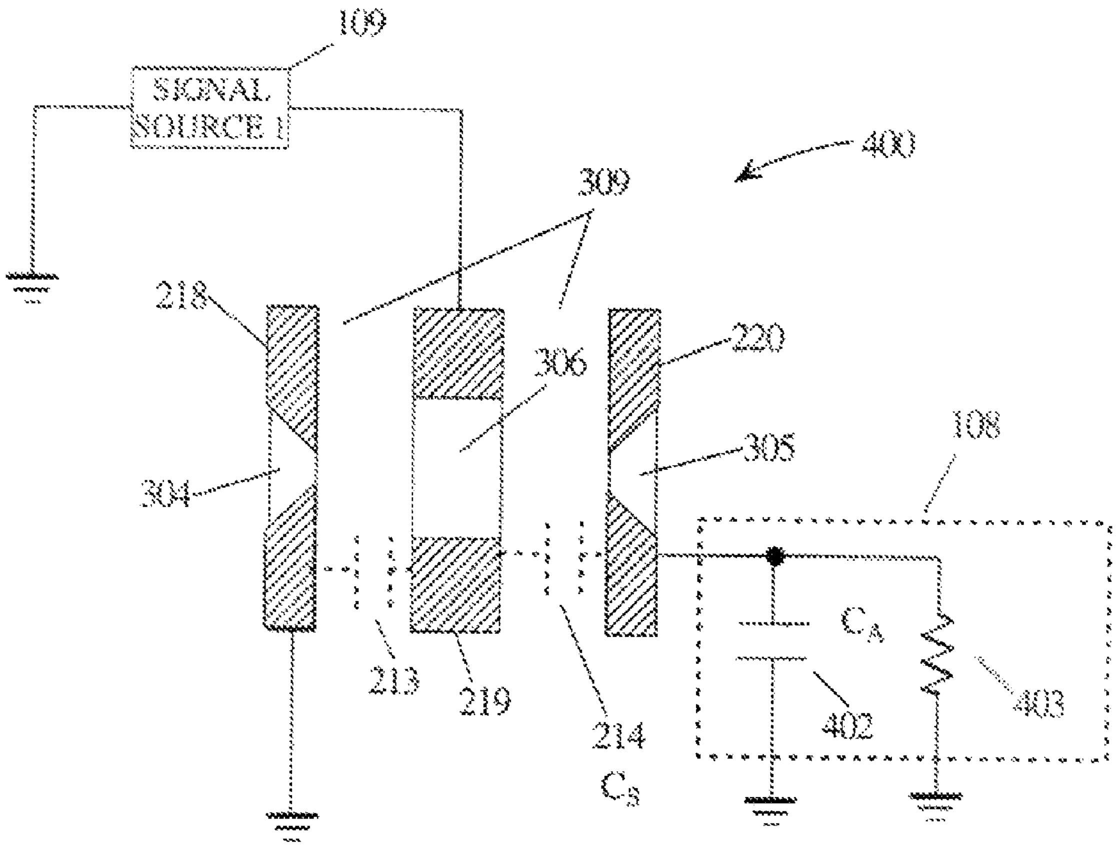
FIG. 4 illustrates circuitry for modifying the performance of an ion trap.

FIG. 4 illustrates a schematic block diagram 400 of ion trap 104 actively driven by circuitry 109 (see FIGS. 1 and 2). End cap 218 has inlet aperture 304 for collecting a sample gas, central electrode 219 has aperture 306 for holding generated ions, and second end cap 220 has outlet aperture 305. End cap 218 may be coupled to ground or zero volts, however, other embodiments may use other than zero volts or an additional signal source. Central electrode 219 is driven by circuitry 109. End cap 220) may be connected to zero volts by modifying circuitry 108 (in this embodiment, comprising a parallel combination of capacitor 402 and resistor 403). Thin insulators (not shown) may be positioned in spaces 309 to isolate first end cap 218, second end cap 220, and central electrode 219.

Embodiment 400 illustrated in FIG. 4 has intrinsic capacitance 214 (noted by dotted line) that naturally exists between central electrode 219 and end cap 220. Capacitance 214 is in series with the capacitance of capacitor 402 and thus forms a capacitive voltage divider thereby impressing a potential derived from signals from circuitry 109 at end cap 220. When circuitry 109 impresses a varying voltage on central electrode 219, a varying voltage of lesser amplitude is impressed upon end cap 220 through action of the capacitive voltage divider. Naturally, there exists a corresponding intrinsic capacitance 213 (noted by dotted line) between central electrode 219 and end cap 218. Discrete resistor 403 may be added between end cap 220 and zero volts. Resistor 403 provides an electrical path that acts to prevent end cap 220 from developing a floating DC potential that could cause voltage drift or excess charge build-up. The value of resistor 403 is sized to be in the range of 1 to 10 Mega-ohms (MΩ) to ensure that the impedance of resistor 403 is much greater than the impedance of added capacitor 402 at an operating frequency of circuitry 109. If the resistance value of resistor 403 is not much greater than the impedance of $C_A$ 402, then there will be a phase shift between the signal at central electrode 219 and the signal impressed on second end cap 220 by the capacitive voltage divider. Also, the amplitude of the signal impressed on end cap 220 will vary as a function of frequency in the frequency range of interest if the value of resistor 403 is too low. Without resistor 403, the capacitive voltage divider ($C_S$ 214 and $C_A$ 402) is substantially independent of frequency. The value of added capacitor 402 may be made variable so that it may be adjusted to have an optimized value for a given system characteristic.

Figure 5A:
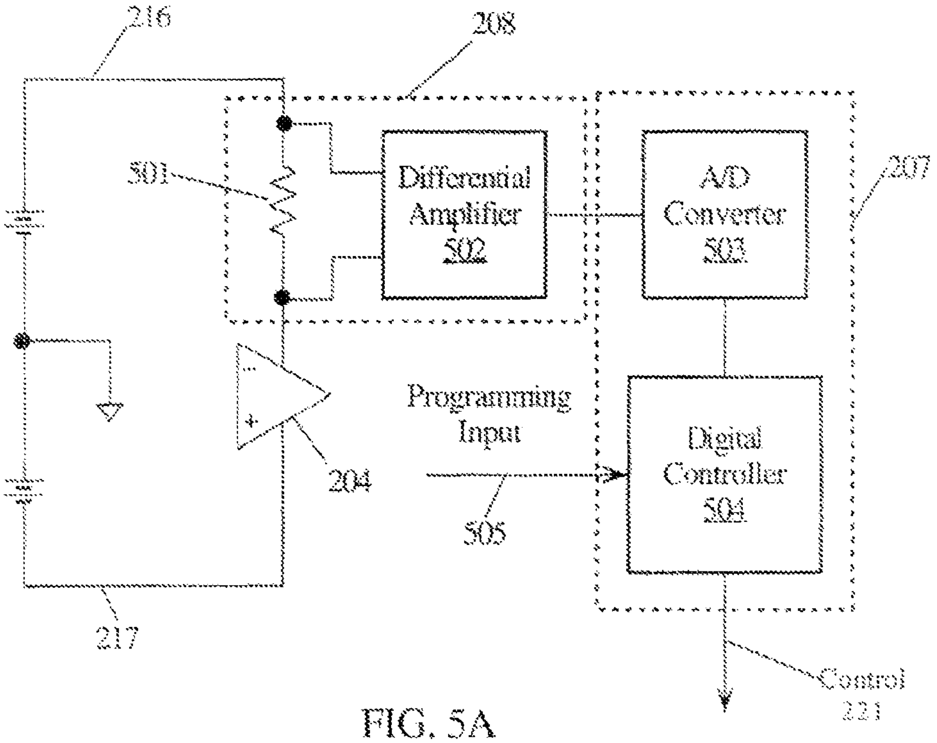
FIG. 5A illustrates circuitry for generating a feedback signal to control the RF signal source.

FIG. 5A illustrates exemplary circuitry for generating a feedback signal on control line 221 (see FIG. 2) suitable for controlling programmable RF signal source 201. Note that signals on control line 221 may be an analog voltage or voltages, or a digital communication method formed from one or more lines. Amplifier 204 is powered by power supply voltages 216 and 217. In this embodiment, current sense resistor 501 is coupled in series with voltage 216 and its voltage drop is coupled to differential amplifier 502. By monitoring the current draw to amplifier 204 on only one of the amplifier's bipolar supplies, the power can be monitored without the need for high speed rectification or similar means which would be required if the output current of amplifier 204 was monitored instead. Differential amplifier 502 produces an output voltage proportional to the power supply current supplying circuitry 109 to ion trap 104. Analog to digital (A/D) converter 503 converts this voltage to a digital value. Digital controller 504 receives the digital value and outputs on control line 221 a digital control signal in response to the total power for circuitry 109 to ion trap 104. Digital controller 504 may be a stored program controller receiving programming from input 505. Program steps may then be stored that direct the values outputted for the digital control signal in response to received digital values corresponding to power of circuitry 109. In this manner, a program may be written and stored that directs how circuitry 109 for ion trap 104 is initialized and automatically adjusted to drive ion trap 104 at the lowest possible power level.

Figure 5B:
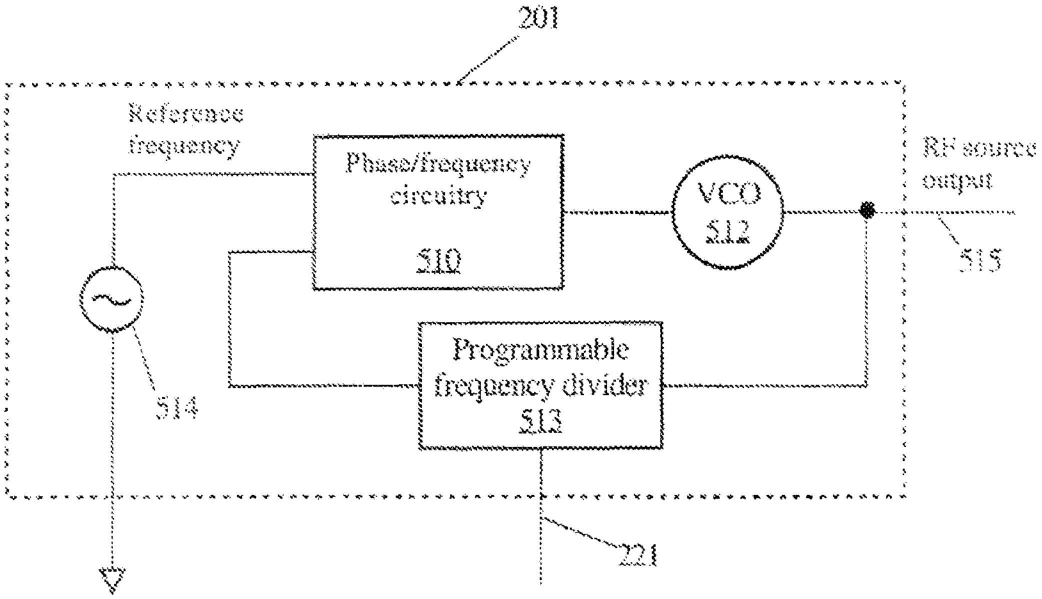
FIG. 5B illustrates circuitry configuring a frequency controlled RF signal source.

FIG. 5B illustrates a block diagram of exemplary circuitry for configuring programmable RF source 201 (see FIG. 2). Reference frequency 514 is compared to the output of programmable frequency divider 513 using phase frequency circuitry 510. Frequency divider 513 divides, by a programmable factor N, the output of voltage controlled oscillator (VCO) 512 that generates output 515 from source 201. In this configuration, the RF source frequency will be N times reference frequency 514. Since the number N is programmable, the digital values on control 221 may be used to control the frequency of output 515. There are many variations possible for the exemplary circuitry shown for RF source 201 that may be employed in embodiments of circuitry 109. The functionality of RF source 201 may also be available in a single integrated circuit.

Figure 6:
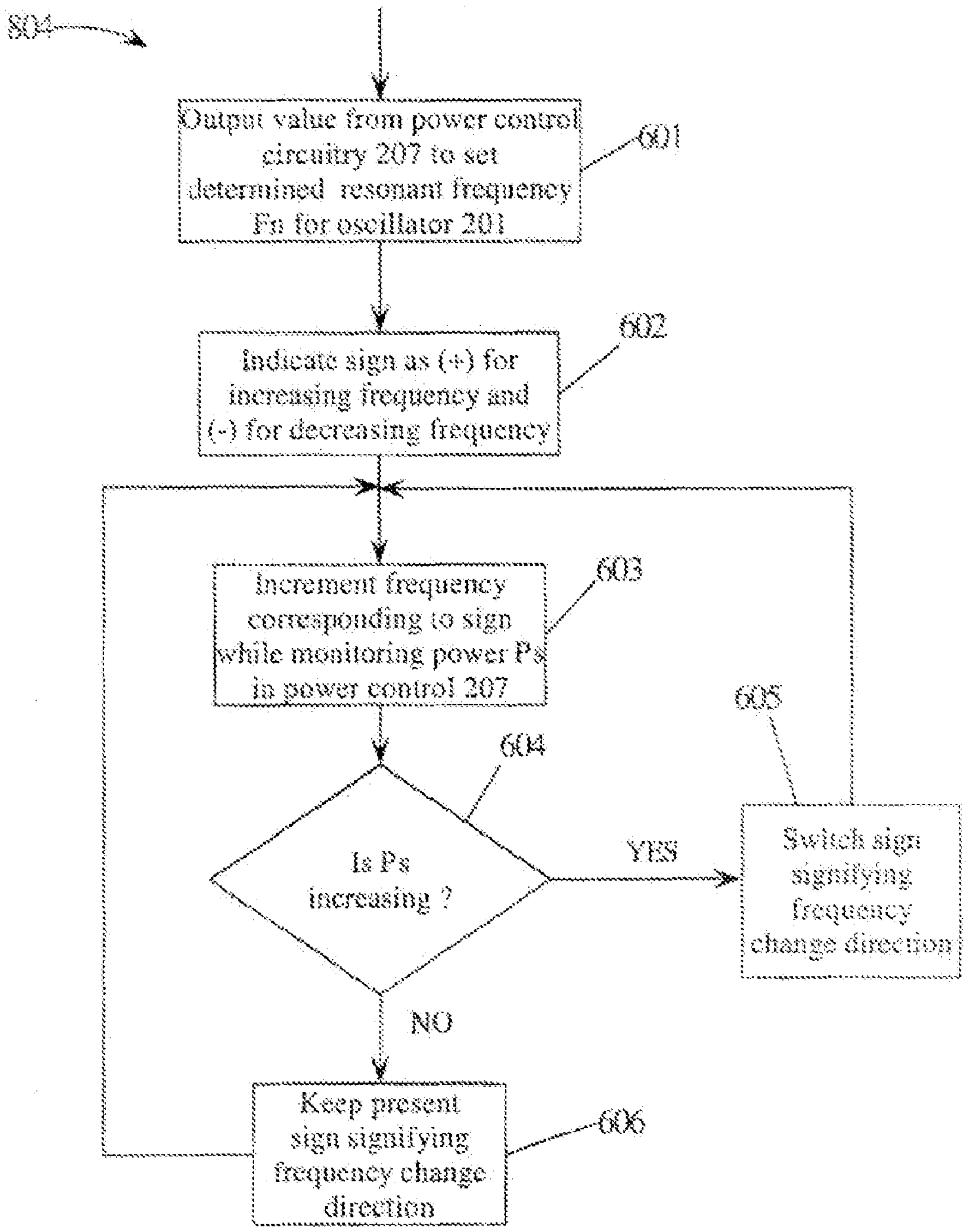
FIG. 6 illustrates a flow diagram of frequency tracking for the RF system of FIG. 2.

FIG. 6 illustrates a flow diagram of steps executed in power control circuitry 207 and used in optional frequency tracking step 804 for circuitry 109 of FIG. 2. In step 601, a value is outputted from power control circuitry 207 to set RF source 201 to the determined resonant frequency Fn from the steps in FIG. 7. In step 602, a plus sigil is used to indicate an increase in the frequency of oscillator 201, and a minus sign is used to indicate a decrease in the frequency of oscillator 201. The initial sign value is chosen arbitrarily or is based upon the expected direction of resonant frequency drift. In step 603, the frequency of oscillator 201 is incremented by a predetermined amount in the direction indicated by the present sign while power control circuitry 207 monitors the power Ps to ion trap 104. In step 604, a test is done to determine if the power Ps is increasing. If the result of the test is YES, the sign signifying the frequency change direction is switched to the alternate sign. A branch is then taken back to step 603. If the result of the test in step 604 is NO, then the present sign is kept as is and a branch is taken back to step 603. In this manner, the frequency of oscillator 201 is dithered back and forth to keep the power to ion trap 104 at a minimum value.

Figure 7:
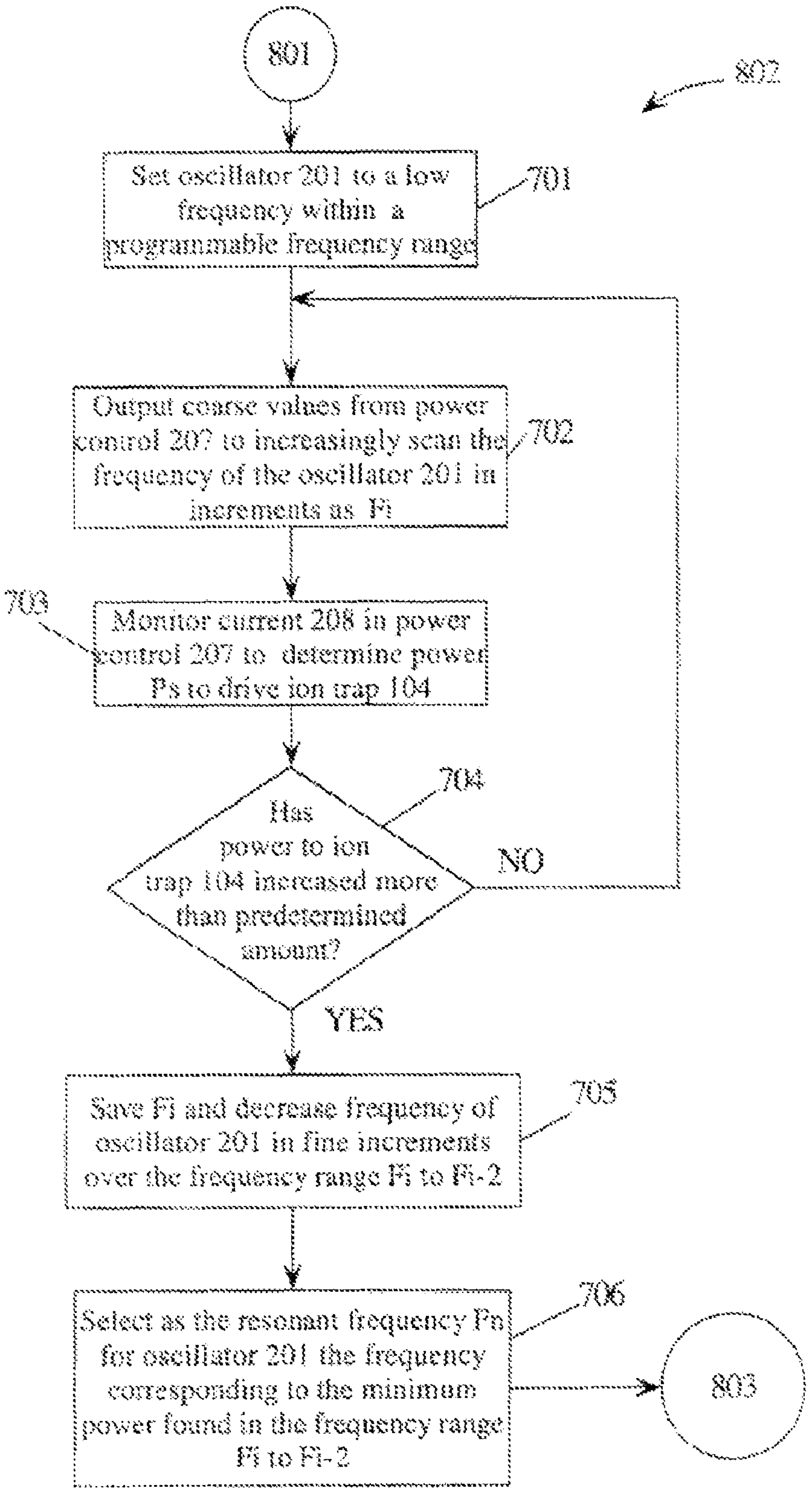
FIG. 7 illustrates a flow diagram to determine the resonant frequency for the RF system of FIG. 2.

FIG. 7 illustrates a flow diagram of steps executed in power control circuitry 207 and used in step 802 while searching for a resonant operating frequency. In step 701. RF source 201 is set to a low programmable frequency within a programmable frequency range. The frequency range is determined based on the successful operating frequency range of the ion trap or mass filter and is minimized to reduce search time. The amplitude of this signal is held constant and is set low enough so as not to cause excessive power draw or heating at frequencies that are significantly far from the resonant frequency. In step 702, coarse values are outputted to increasingly scan the frequency of the oscillator in increments. This value is given a variable indicator Fi. In step 703, current to circuitry 109 is monitored to determine the power Ps to drive ion trap 104. In step 704, a test is done to determine if the power to the ion trap 104 has increased more than a predetermined amount. If the result of the test in step 704 is NO, then a branch is taken back to step 702. If the result of the test in step 704 is YES, then a branch is taken to step 705 where the current Fi is saved and the frequency is decreased in fine increments over the frequency range Fi to Fi-2. In step 705, fine values of adjusting the frequency of oscillator are outputted to decrease the frequency of the oscillator over the range Fi (last coarse frequency step) to Fi-2 which encompasses the last three outputted coarse frequency steps. In step 706, the resonant frequency Fn is selected as the resonant frequency corresponding to the minimum power found while scanning over the frequency range Fi to Fi-2. A branch is then taken back to step 803 (see FIG. 8).

Amplifier 204 has two power supply inputs that supply the power to amplifier 204, one for a positive voltage 216 and one for a negative voltage 217. A small resistor (current shunt resistor) may be placed in line with the positive power supply pin 216 (see circuitry 208 in FIG. 2). Any current flowing into this power supply input will how through this resistor. Since the resistance of this resistor in ohms is known, die current that flows through this resistor is known by measuring the voltage drop across this resistor (V=I*R). When the voltage drop across this resistor is a minimum, the current flowing through the power supply pin is also at a minimum, and therefore the power used by amplifier 204 is at a minimum. At the resonant frequency of the circuit, the current input to amplifier 204 drops significantly. The system sweeps through the full frequency range of the system prior to operation in order to find this resonant frequency (by monitoring the voltage across the current shunt resistor as the frequency is scanned). The voltage across the current shunt resistor may be amplified by a current shunt amplifier component and fed to an analog-to-digital converter. The digital output of the analog-to-digital converter may be fed to a microprocessing element, such as within power control circuitry 207. The system monitors the current into one of the bipolar power supplies, instead of measuring the output voltage directly. This provides a more accurate value for the true resonant frequency, and removes the need to rectify the signal, use a peak detector, or to perform an RMS conversion to determine amplitude.

Figure 8:
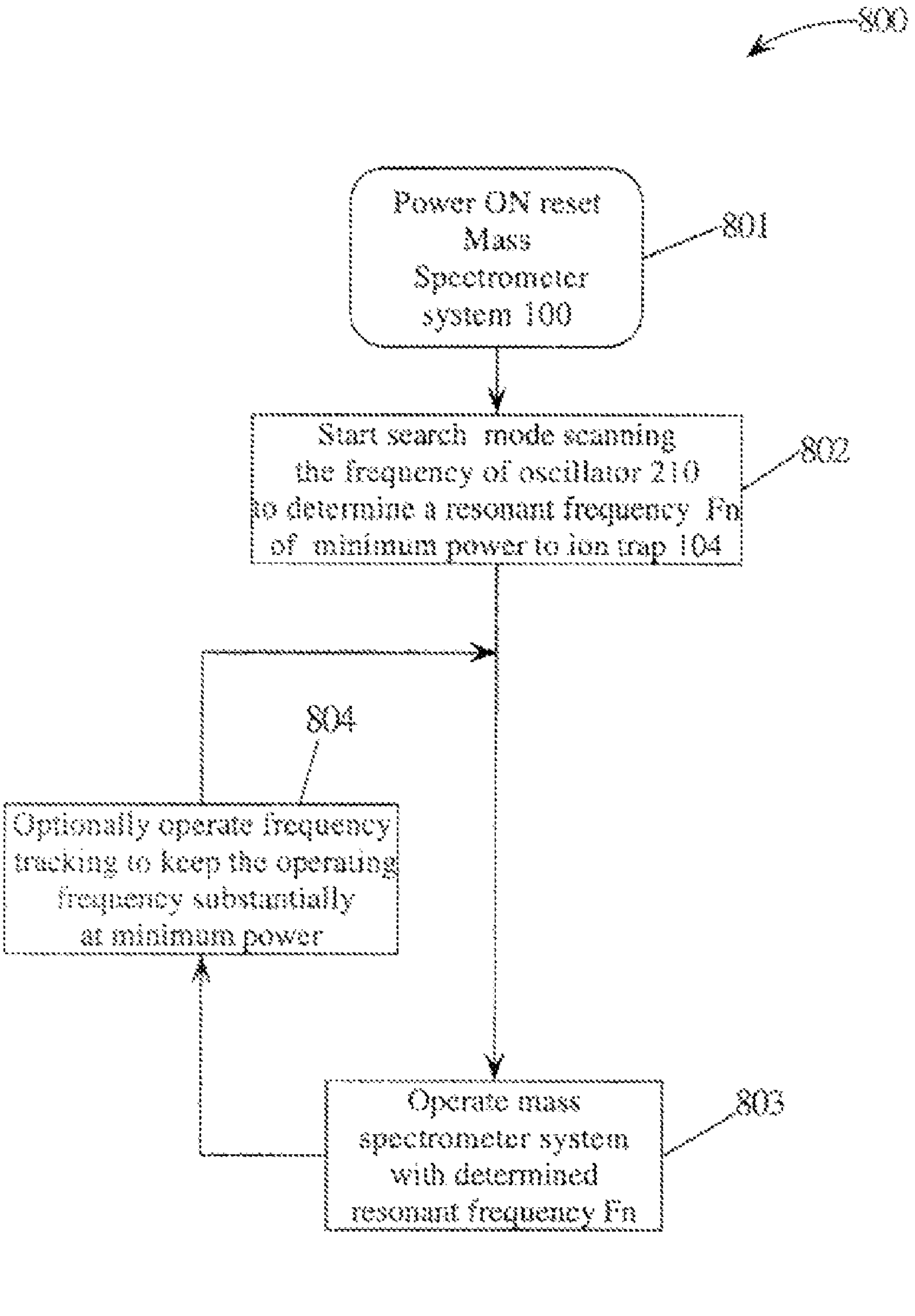
FIG. 8 illustrates a flow diagram in accordance with embodiments of the present invention.

FIG. 8 illustrates a flow diagram of general steps executed in power control circuitry 207 while operating circuitry 109 of FIG. 2. In step 801, mass spectrometer 100 is powered ON with a reset. In step 802, a search mode is started where the frequency of RF source 201 is adjusted to determine a resonant frequency with minimum power to drive exemplary ion trap 104 (e.g., see FIG. 7). In step 803, mass spectrometer system 100 is operated with the determined resonant frequency. In step 804, optional frequency tracking is started during system operation to keep the operating frequency at a minimum power to drive the ion trap 104 in response changes in the resonant point of the ion trap and associated circuitry (e.g., see FIG. 6).

Figure 9:
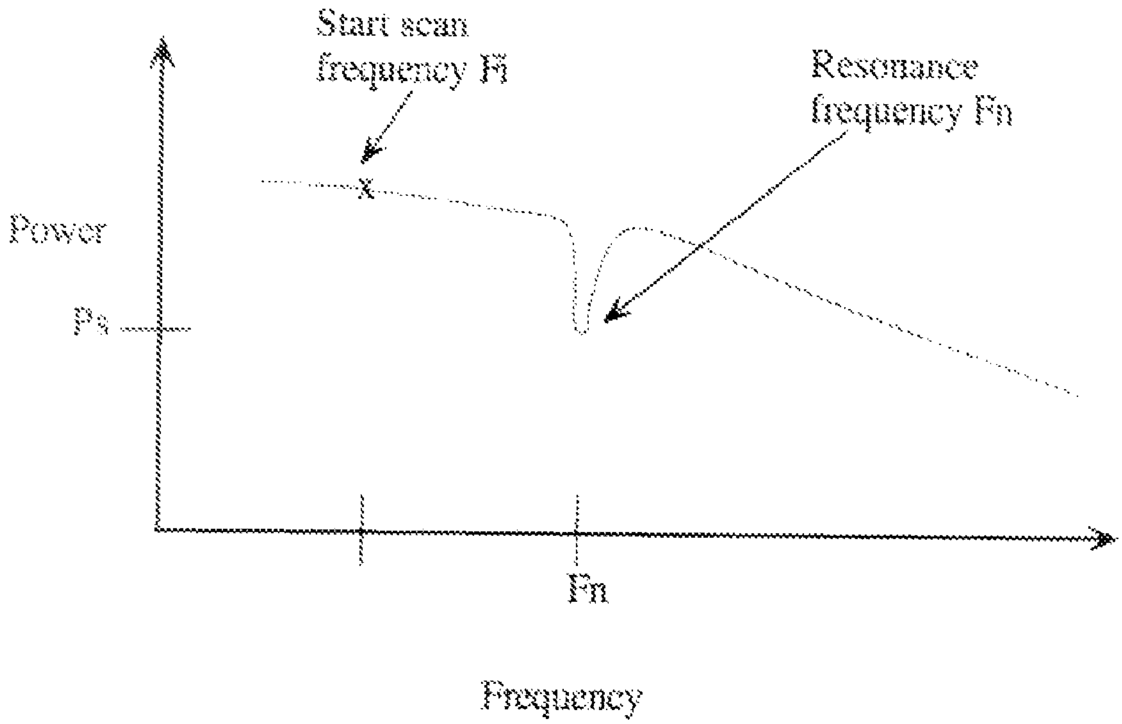
FIG. 9 illustrates an exemplary plot of frequency versus power supplied to an ion trap.

FIG. 9 illustrates an exemplary plot of frequency versus power to drive ion trap 104 in accordance with embodiments of the present invention. The start scan frequency Fi is shown along with the resonant frequency Fn. Fn coincides with the minimum power consumption point for amplifier 204. The continued power drop as frequency continues to increase beyond Fn is due to the bandwidth limitations of amplifier 204.

Embodiments described herein operate to reduce the power and size of a mass spectrometer so that the mass spectrometer system may become a component in other systems that previously could not use such a unit because of cost and the size of conventional units. For example, mini-mass spectrometer 100 may be placed in a hazard site to analyze gases and remotely send back a report of conditions presenting danger to personnel. Mini-mass spectrometer 100 using embodiments herein may be placed at strategic positions on air transport to test the environment for hazardous gases that may be an indication of malfunction or even a terrorist threat. The present invention has anticipated the value in reducing the size and power required to make a functioning mass spectrometer so that its operation may be used in places and in applications not normally considered for such a device.

A number of embodiments of the invention have been described. Nevertheless, it will be understood that various modifications may be made without departing from the spirit and scope of the invention.

What is claimed is:

1. A system for driving a mass spectrometer ion trap or mass filter, comprising:
- a frequency and amplitude programmable RF generator producing an RF signal;
- an RF gain stage receiving the RF signal and generating an amplified RF signal;
- sense circuitry generating a sense signal proportional to a supply current delivered to the RF gain stage;
- a transformer having a primary coupled to an output of the RF gain stage and a secondary coupled to form a tank circuit with a capacitance of the mass spectrometer ion trap or mass filter; and
- power circuitry receiving the sense signal and generating a feedback control signal to the RF generator that adjusts a frequency of the RF generator to decrease a power level of the RF signal supplied to the RE gain stage.

2. The system of claim 1, wherein the sense circuitry comprises:
- a current sense resistor in series with a power supply input to the RF gain stage; and
- a differential amplifier having a positive input coupled to one terminal of the resistor and a negative input coupled to a second terminal of the resistor, wherein the differential amplifier generates an output signal proportional to power supplied to the RE gain stage.

3. The system of claim 2, wherein the programmable RF generator comprises a phase locked loop (PLL) circuit with a programmable frequency divider circuit.

4. The system of claim 3, wherein the programmable frequency divider circuit is digitally programmable.

5. The system of claim 4, further comprising an analog to digital (A/D) converter for converting an output voltage of the differential amplifier to a digital feedback signal.

6. The system of claim 1, wherein the transformer is a step up transformer with a secondary inductance that forms a resonance circuit with a capacitance of the mass spectrometer ion trap or mass filter.

7. The system of claim 1, wherein the RF generator is coupled to the RF gain stage with a filter circuit.

8. The system of claim 7, wherein the RF generator is coupled to the primary of the transformer.

9. The system of claim 1, wherein a gain of the RF gain stage is set by a ratio of resistors.

10. The system of claim 8, wherein the filter circuit includes a series resistor.

11. The system of claim 1, further comprising a variable capacitor in parallel with the mass spectrometer ion trap or mass filter configured for tuning the mass spectrometer ion trap or mass filter to a particular operating frequency range.

12. A radio frequency (RF) driver system for driving a mass spectrometer ion trap or mass filter comprising:
- a transformer having a secondary coupled to the mass spectrometer ion trap or mass filter;
- a RF gain stage having an output coupled to a primary of the transformer; and
- a frequency and amplitude programmable RF source generating a signal coupled to an input of the RF gain stage, circuitry of the programmable RF source configured so that the frequency of the programmable RF source is dynamically adjusted to decrease to a minimum a power level supplied to the RF gain stage when driving the mass spectrometer ion trap or mass filter.

13. A method of operating a mass spectrometer comprising:
- driving the mass spectrometer with a signal in order to trap ions therein, wherein circuitry for driving the mass spectrometer comprises an RF gain stage coupled to the mass spectrometer via a transformer, and wherein an RF generator is coupled to an input of the RF gain stage;
- monitoring a power level supplied to the RF gain stage while driving the mass spectrometer and generating a feedback signal proportional to the power level; and
- coupling the feedback signal to adjust a frequency of the RF generator to decrease the power level supplied to the RF gain stage when driving the mass spectrometer.

* * * * *

UNITED STATES PATENT AND TRADEMARK OFFICE

CERTIFICATE OF CORRECTION

PATENT NO. : 7,973,277 B2
APPLICATION NO. : 12/472111
DATED : July 5, 2011
INVENTOR(S) : David Rafferty It is certified that error appears in the above-identified patent and that said Letters Patent is hereby corrected as shown below:

First Page, Column 1, under References Cited, delete “Huffer” and insert -- Hutter --.

Column 8, line 8, in claim 1, delete “RE” and insert -- RF --.

Column 8, line 16, in claim 2, delete “RE” and insert -- RF --.

Signed and Sealed this
Fourteenth Day of February, 2012

David J. Kappos
*Director of the United States Patent and Trademark Office*